(12) United States Patent
Chang et al.

(10) Patent No.: US 12,743,249 B2
(45) Date of Patent: Sep. 22, 2026

(54) FLOATING POINT PRE-ALIGNMENT STRUCTURE FOR COMPUTING-IN-MEMORY APPLICATIONS AND COMPUTING METHOD THEREOF

(71) Applicant: NATIONAL TSING HUA UNIVERSITY, Hsinchu (TW)

(72) Inventors: Meng-Fan Chang, Hsinchu (TW); Ping-Chun Wu, Hsinchu (TW); Jin-Sheng Ren, Hsinchu (TW); Li-Yang Hong, Hsinchu (TW); Ho-Yu Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 988 days.

(21) Appl. No.: 18/053,759

(22) Filed: Nov. 9, 2022

(65) Prior Publication Data

US 2024/0152321 A1 May 9, 2024

(51) Int. Cl.
*G06F 7/483* (2006.01)
*G06F 5/01* (2006.01)

(52) U.S. Cl.
CPC .............. *G06F 7/483* (2013.01); *G06F 5/012* (2013.01)

(58) Field of Classification Search
CPC . G06F 5/01; G06F 5/012; G06F 7/483; G06F 7/5443; G06F 15/7821; G06N 3/049
See application file for complete search history.

(56) References Cited

U.S. PATENT DOCUMENTS

2020/0272687 A1* 8/2020 Chen ...................... G06F 5/012

OTHER PUBLICATIONS

Z. Chen et al., "Time-Domain Computing Accelerated Image Recognition Processor With Efficient Time Encoding and Non-Linear Logic Operation", 2019. (Year: 2019).*
C. Wu et al., "Floating-Point 6T SRAM In-Memory-Computing Macro Using Hybrid-Domain Structure for Advanced AI Edge Chips", 2024. (Year: 2024).*
P. Wu et al., "A 28nm 1Mb Time-Domain Computing-in-Memory 6T-SRAM Macro with 6.6ns Latency, 1241GOPS and 37.01TOPS/W for 8b-MAC Operations for Edge-AI Devices", Feb. 2022. (Year: 2022).*

* cited by examiner

*Primary Examiner* — Emily E Larocque
*Assistant Examiner* — Maria De Jesus Rivera
(74) *Attorney, Agent, or Firm* — CKC & Partners Co., LLC

(57) ABSTRACT

A floating point pre-alignment structure for computing-in-memory applications includes a time domain exponent computing block and an input mantissa pre-align block. The time domain exponent computing block is configured to compute a plurality of original input exponents and a plurality of original weight exponents to generate a plurality of flags. Each of the flags is determined by adding one of the original input exponents and one of the original weight exponents. The input mantissa pre-align block is configured to receive a plurality of original input mantissas and shift the original input mantissas according to the flags to generate a plurality of weighted input mantissas, and sparsity of the weighted input mantissas is greater than sparsity of the original input mantissas. Each of the flags has a negative correlation with a sum of the one of the original input exponents and the one of the original weight exponents.

20 Claims, 6 Drawing Sheets

Original Input

Increase Input Sparsity

All 0 Input

| $IN_{En}+W_{En}$ | Weighted Input Mantissa | | | | | | | |
|---|---|---|---|---|---|---|---|---|
| MAX(EXP) | 1 | $M_6$ | $M_5$ | $M_4$ | $M_3$ | $M_2$ | $M_1$ | $M_0$ |
| MAX(EXP)-1 | 0 | 1 | $M_6$ | $M_5$ | $M_4$ | $M_3$ | $M_2$ | $M_1$ |
| MAX(EXP)-2 | 0 | 0 | 1 | $M_6$ | $M_5$ | $M_4$ | $M_3$ | $M_2$ |
| MAX(EXP)-3 | 0 | 0 | 0 | 1 | $M_6$ | $M_5$ | $M_4$ | $M_3$ |
| MAX(EXP)-4 | 0 | 0 | 0 | 0 | 1 | $M_6$ | $M_5$ | $M_4$ |
| MAX(EXP)-5 | 0 | 0 | 0 | 0 | 0 | 1 | $M_6$ | $M_5$ |
| MAX(EXP)-6 | 0 | 0 | 0 | 0 | 0 | 0 | 1 | $M_6$ |
| MAX(EXP)-7 | 0 | 0 | 0 | 0 | 0 | 0 | 0 | 1 |
| <MAX(EXP)-7 | 0 | 0 | 0 | 0 | 0 | 0 | 0 | 0 |

Fig. 7

FLOATING POINT PRE-ALIGNMENT STRUCTURE FOR COMPUTING-IN-MEMORY APPLICATIONS AND COMPUTING METHOD THEREOF

BACKGROUND

Technical Field

The present disclosure relates to a floating point pre-alignment structure and a computing method thereof. More particularly, the present disclosure relates to a floating point pre-alignment structure for computing-in-memory applications and a computing method thereof.

Description of Related Art

Computing-In-Memory (CIM) is a promising solution that can reduce the energy consumption of artificial intelligence (AI) chip multiplication and accumulation (MAC) operations. In order to increase the bandwidth and reduce the power consumption of each operation, CIM would turn on multiple word lines (WL) in a memory array to compute at the same time. The computing results will accumulate on bit lines (BL) and read out by readout circuit or digital circuit that both are the current development directions. However, most conventional CIM structures only support integer (INT) operation. For different applications, such as cloud deep learning (DL) which requires higher precision for neural network (NN) inference and training, supporting floating point (FP) CIM is necessary. Comparing with INT, FP has more complicated operation. Realizing CIM FP operation and operate FP efficiently are the challenges for wide application higher precision in CIM.

When operating FP, there are exponent (EXP) part and mantissa (MAN) part. When operating MAC, the conventional CIM structures need to align to same EXP value so as to accumulate each other. The conventional CIM structures cannot support directly floating-point accumulation. In addition, the conventional CIM MAC operation is restricted by the structure, thus causing CIM cannot directly accumulate FP and reducing the application of CIM. When using conventional digital circuit to perform MAC operation of FP, it will cause more power consumption, area and access time. Accordingly, a FP pre-alignment structure for CIM applications and a computing method thereof having the features of supporting floating point, reducing power consumption and enhancing FP CIM performance are commercially desirable.

SUMMARY

According to one aspect of the present disclosure, a floating point pre-alignment structure for computing-in-memory applications includes a time domain exponent computing block and an input mantissa pre-align block. The time domain exponent computing block is configured to compute a plurality of original input exponents and a plurality of original weight exponents. The time domain exponent computing block includes a time domain exponent computing array, a winner-take-all circuit and a dynamic logic block. The time domain exponent computing array is configured to delay a plurality of exponent input signals by a plurality of delay time periods to generate a plurality of exponent delay output signals. Each of the delay time periods is determined by adding one of the original input exponents and one of the original weight exponents. The winner-take-all circuit is connected to the time domain exponent computing array and configured to find out one of the exponent delay output signals as a maximum exponent adding signal. The one of the exponent delay output signals is corresponding to a minimum one of the delay time periods. The dynamic logic block is connected to the winner-take-all circuit and is configured to compare the maximum exponent adding signal with the exponent delay output signals to generate a plurality of flags. The input mantissa pre-align block is connected to the time domain exponent computing block. The input mantissa pre-align block is configured to receive a plurality of original input mantissas and shift the original input mantissas according to the flags to generate a plurality of weighted input mantissas, and sparsity of the weighted input mantissas is greater than sparsity of the original input mantissas.

According to another aspect of the present disclosure, a computing method of a floating point pre-alignment structure for computing-in-memory applications includes performing a voltage level applying step and a computing step. The voltage level applying step includes applying a plurality of voltage levels to a plurality of exponent input signals, a plurality of original input exponents, a plurality of original weight exponents and a plurality of original input mantissas. The computing step is performed to configure a time domain exponent computing block to compute the original input exponents and the original weight exponents. The computing step includes performing a first computing step, a second computing step, a third computing step and a fourth computing step. The first computing step includes configuring a time domain exponent computing array to delay the exponent input signals by a plurality of delay time periods to generate a plurality of exponent delay output signals, and each of the delay time periods is determined by adding one of the original input exponents and one of the original weight exponents. The second computing step includes configuring a winner-take-all circuit to find out one of the exponent delay output signals as a maximum exponent adding signal, and the one of the exponent delay output signals is corresponding to a minimum one of the delay time periods. The third computing step includes configuring a dynamic logic block to compare the maximum exponent adding signal with the exponent delay output signals to generate a plurality of flags. The fourth computing step includes configuring an input mantissa pre-align block to receive the original input mantissas and shift the original input mantissas according to the flags to generate a plurality of weighted input mantissas, and sparsity of the weighted input mantissas is greater than sparsity of the original input mantissas.

According to further another aspect of the present disclosure, a floating point pre-alignment structure for computing-in-memory applications includes a time domain exponent computing block and an input mantissa pre-align block. The time domain exponent computing block is configured to compute a plurality of original input exponents and a plurality of original weight exponents to generate a plurality of flags. Each of the flags is determined by adding one of the original input exponents and one of the original weight exponents. The input mantissa pre-align block is connected to the time domain exponent computing block. The input mantissa pre-align block is configured to receive a plurality of original input mantissas and shift the original input mantissas according to the flags to generate a plurality of weighted input mantissas, and sparsity of the weighted input mantissas is greater than sparsity of the original input mantissas. Each of the flags has a negative correlation with a sum of the one of the original input exponents and the one of the original weight exponents.

BRIEF DESCRIPTION OF THE DRAWINGS

The present disclosure can be more fully understood by reading the following detailed description of the embodiment, with reference made to the accompanying drawings as follows:

FIG. 7 shows a schematic view of a relationship between a plurality of weighted input mantissas and a plurality of sums of original input exponents and original weight exponents.

DETAILED DESCRIPTION

Figure 1:
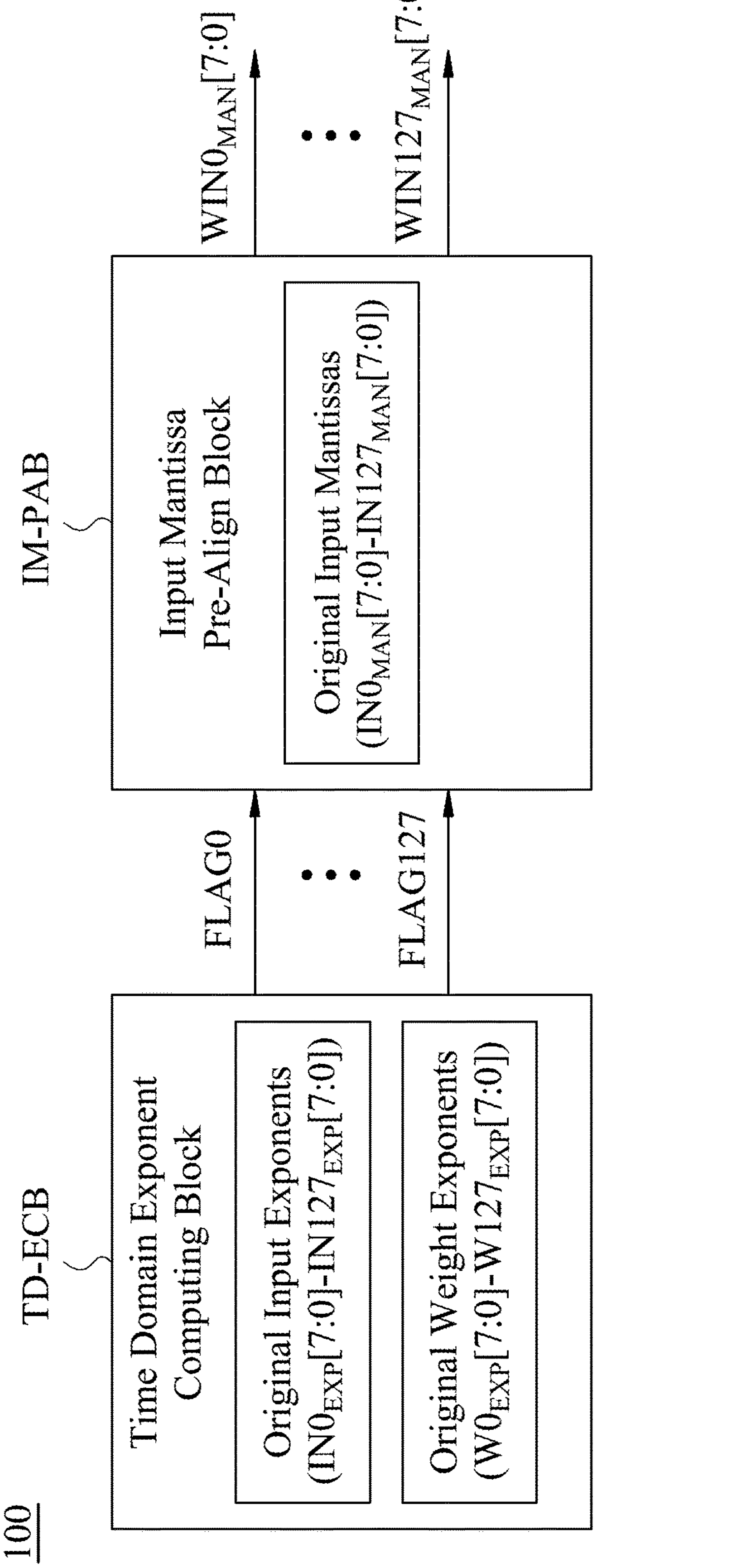
FIG. 1 shows a schematic view of a floating point pre-alignment structure for computing-in-memory applications according to a first embodiment of the present disclosure.

Embodiments of the present disclosure will be described with reference to the drawings. For clarity, some practical details will be described below. However, it should be noted that the present disclosure should not be limited by the practical details, that is, in some embodiments, the practical details are unnecessary. In addition, for simplifying the drawings, some conventional structures and elements will be simply illustrated, and repeated elements may be represented by the same reference numerals.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, and these elements or components should not be limited by these terms. Consequently, a first element or component discussed below could be termed a second element or component.

Before describing any embodiments in detail, some terms used in the following are described. A voltage level of "1" represents that the voltage is equal to a power supply voltage VDD. The voltage level of "0" represents that the voltage is equal to a ground voltage GND. A PMOS transistor and an NMOS transistor represent a P-type MOS transistor and an N-type MOS transistor, respectively. Each transistor has a source, a drain and a gate.

Reference is made to FIG. 1. FIG. 1 shows a schematic view of a floating point pre-alignment structure 100 for computing-in-memory (CIM) applications according to a first embodiment of the present disclosure. The floating point pre-alignment structure 100 for CIM applications includes a time domain exponent computing block TD-ECB and an input mantissa pre-align block IM-PAB. The time domain exponent computing block TD-ECB is configured to compute a plurality of original input exponents $\mathbf{IN0}_{EXP}[\mathbf{7}:\mathbf{0}]$-$\mathbf{IN127}_{EXP}[\mathbf{7}:\mathbf{0}]$ and a plurality of original weight exponents $\mathbf{W0}_{EXP}[\mathbf{7}:\mathbf{0}]$-$\mathbf{W127}_{EXP}[\mathbf{7}:\mathbf{0}]$ to generate a plurality of flags FLAG0-FLAG127. Each of the flags FLAG0-FLAG127 is determined by adding one of the original input exponents $\mathbf{IN0}_{EXP}[\mathbf{7}:\mathbf{0}]$-$\mathbf{IN127}_{EXP}[\mathbf{7}:\mathbf{0}]$ and one of the original weight exponents $\mathbf{W0}_{EXP}[\mathbf{7}:\mathbf{0}]$-$\mathbf{W127}_{EXP}[\mathbf{7}:\mathbf{0}]$. The input mantissa pre-align block IM-PAB is connected to the time domain exponent computing block TD-ECB. The input mantissa pre-align block IM-PAB is configured to receive a plurality of original input mantissas $\mathbf{IN0}_{MAN}[\mathbf{7}:\mathbf{0}]$-$\mathbf{IN127}_{MAN}[\mathbf{7}:\mathbf{0}]$ and shift the original input mantissas $\mathbf{IN0}_{MAN}[\mathbf{7}:\mathbf{0}]$-$\mathbf{IN127}_{MAN}[\mathbf{7}:\mathbf{0}]$ according to the flags FLAG0-FLAG127 to generate a plurality of weighted input mantissas $\mathbf{WIN0}_{MAN}[\mathbf{7}:\mathbf{0}]$-$\mathbf{WIN127}_{MAN}[\mathbf{7}:\mathbf{0}]$, and sparsity of the weighted input mantissas $\mathbf{WIN0}_{MAN}[\mathbf{7}:\mathbf{0}]$-$\mathbf{WIN127}_{MAN}[\mathbf{7}:\mathbf{0}]$ is greater than sparsity of the original input mantissas $\mathbf{IN0}_{MAN}[\mathbf{7}:\mathbf{0}]$-$\mathbf{IN127}_{MAN}[\mathbf{7}:\mathbf{0}]$. Each of the flags FLAG0-FLAG127 has a negative correlation with a sum of the one of the original input exponents $\mathbf{IN0}_{EXP}[\mathbf{7}:\mathbf{0}]$-$\mathbf{IN127}_{EXP}[\mathbf{7}:\mathbf{0}]$ and the one of the original weight exponents $\mathbf{W0}_{EXP}[\mathbf{7}:\mathbf{0}]$-$\mathbf{W127}_{EXP}[\mathbf{7}:\mathbf{0}]$. The sparsity has a positive correlation with the number of "0".

Therefore, the floating point pre-alignment structure 100 for CIM applications of the present disclosure can utilize the time domain exponent computing block TD-ECB and the input mantissa pre-align block IM-PAB to shift the original input mantissas $\mathbf{IN0}_{MAN}[\mathbf{7}:\mathbf{0}]$-$\mathbf{IN127}_{MAN}[\mathbf{7}:\mathbf{0}]$ according to the exponent part of the input and the exponent part of the weight and then perform the multiplication and accumulation (MAC) operation of the mantissa part, thereby realizing the concept of input mantissa pre-alignment and improve the problem of conventional CIM operating floating point. In addition, the floating point pre-alignment structure 100 for CIM applications of the present disclosure does not lose accuracy and increases the sparsity of the weighted input mantissas $\mathbf{WIN0}_{MAN}[\mathbf{7}:\mathbf{0}]$-$\mathbf{WIN127}_{MAN}[\mathbf{7}:\mathbf{0}]$ (i.e., increase input sparsity), thereby reducing power consumption and enhancing floating point CIM performance.

Figure 2:
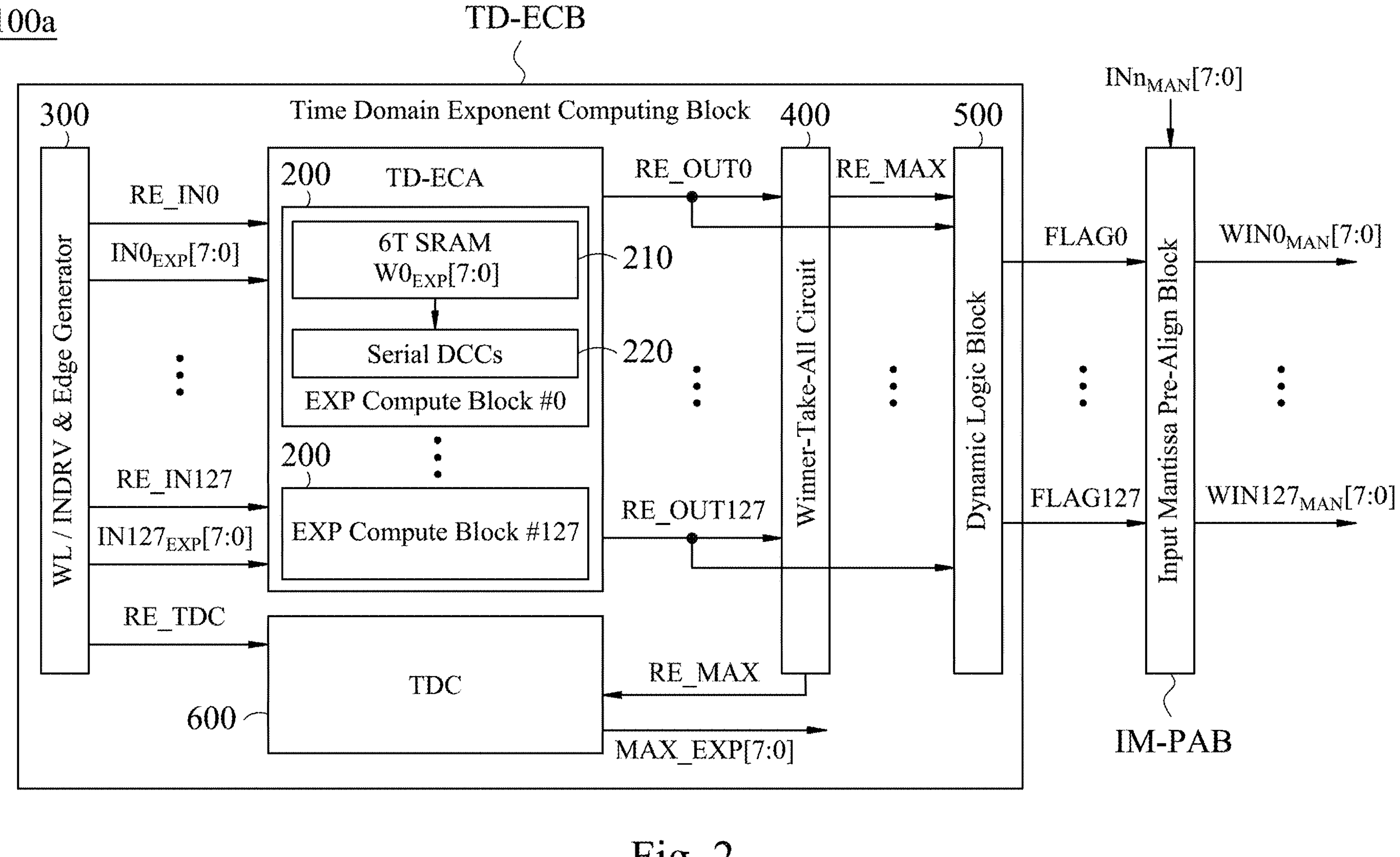
FIG. 2 shows a schematic view of a floating point pre-alignment structure for computing-in-memory applications according to a second embodiment of the present disclosure.
Figures 3, 4:
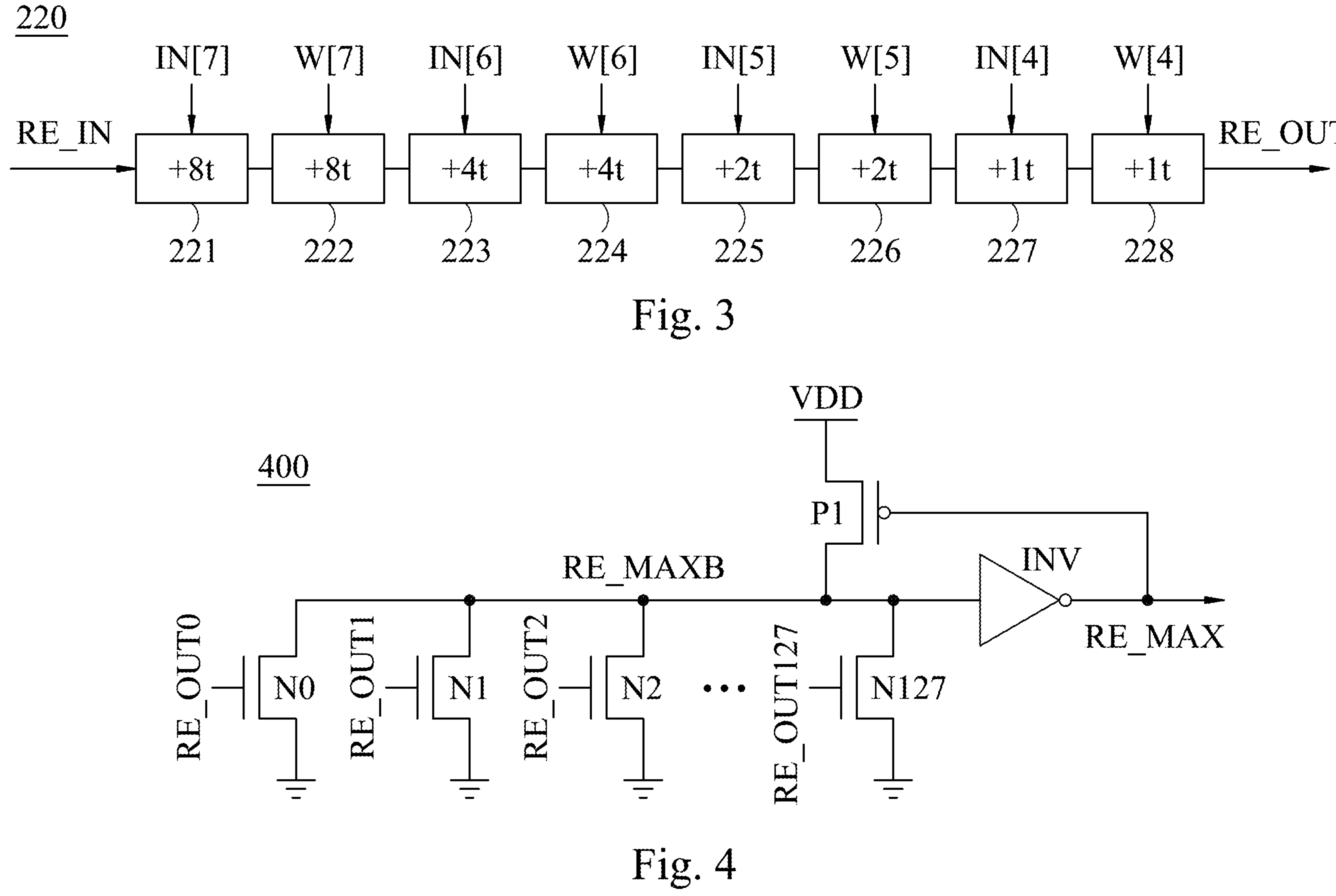
FIG. 3 shows a schematic view of a serial delay computing circuit of the floating point pre-alignment structure for computing-in-memory applications of FIG. 2.
FIG. 4 shows a schematic view of a winner-take-all circuit of the floating point pre-alignment structure for computing-in-memory applications of FIG. 2.
Figures 5, 6:
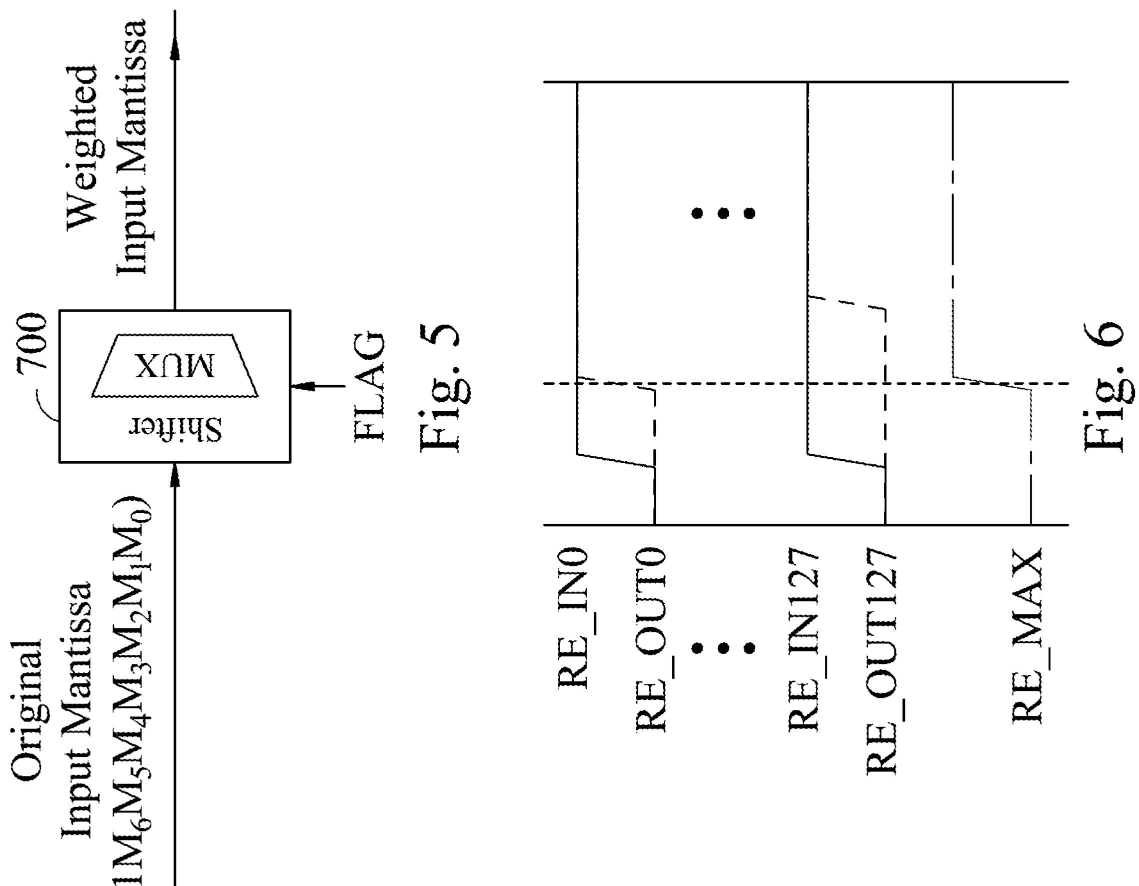
FIG. 5 shows a schematic view of an input mantissa pre-align block of the floating point pre-alignment structure for computing-in-memory applications of FIG. 2.
FIG. 6 shows a timing diagram associated with a plurality of exponent input signals, a plurality of exponent delay output signals and a maximum exponent adding signal of FIG. 2.

Reference is made to FIGS. 1, 2, 3, 4, 5 and 6. FIG. 2 shows a schematic view of a floating point pre-alignment structure 100*a* for CIM applications according to a second embodiment of the present disclosure. FIG. 3 shows a schematic view of a serial delay computing circuit 220 (Serial DCCs) of the floating point pre-alignment structure 100*a* for CIM applications of FIG. 2. FIG. 4 shows a schematic view of a winner-take-all circuit 400 of the floating point pre-alignment structure 100*a* for CIM applications of FIG. 2. FIG. 5 shows a schematic view of an input mantissa pre-align block IM-PAB of the floating point pre-alignment structure 100*a* for CIM applications of FIG. 2. FIG. 6 shows a timing diagram associated with a plurality of exponent input signals RE_IN0-RE_IN127, a plurality of exponent delay output signals RE_OUT0-RE_OUT127 and a maximum exponent adding signal RE_MAX of FIG. 2. The floating point pre-alignment structure 100*a* for CIM applications includes a time domain exponent computing block TD-ECB and the input mantissa pre-align block IM-PAB. The time domain exponent computing block TD-ECB is configured to compute the original input exponents $IN0_{EXP}[7:0]$-$IN127_{EXP}[7:0]$ and the original weight exponents $W0_{EXP}[7:0]$-$W127_{EXP}[7:0]$. The time domain exponent computing block TD-ECB includes a time domain exponent computing array TD-ECA, a word line input driver unit 300, a winner-take-all circuit 400 and a dynamic logic block 500.

The time domain exponent computing array TD-ECA is configured to delay a plurality of exponent input signals RE_IN0-RE_IN127 by a plurality of delay time periods to generate a plurality of exponent delay output signals RE_OUT0-RE_OUT127. Each of the delay time periods is determined by adding one of the original input exponents $IN0_{EXP}[7:0]$-$IN127_{EXP}[7:0]$ and one of the original weight exponents $W0_{EXP}[7:0]$-$W127_{EXP}[7:0]$. In detail, the exponent input signals RE_IN0-RE_IN127 are rising edge input signals and are the same with each other. The time domain exponent computing array TD-ECA includes a plurality of exponent computing modules 200 (e.g., EXP compute Block #0-EXP compute Block #127), and each of the exponent computing modules 200 includes a memory array 210 and a serial delay computing circuit (Serial DCCs) 220.

The memory array 210 includes a plurality of memory cells. The memory cells store the one of the original weight exponents $W0_{EXP}[7:0]$-$W127_{EXP}[7:0]$. The memory cells may be formed in an 8×16 array, but the present disclosure is not limited thereto. In one embodiment, each of the memory cells includes a six-transistor static random access memory (6T SRAM) cell.

The serial delay computing circuit 220 is connected to the memory array 210. The serial delay computing circuit 220 is configured to receive one of the original input exponents $IN0_{EXP}[7:0]$-$IN127_{EXP}[7:0]$ and the one of the original weight exponents $W0_{EXP}[7:0]$-$W127_{EXP}[7:0]$, and delay each of the exponent input signals RE_IN0-RE_IN127 by each of the delay time periods to generate each of the exponent delay output signals RE_OUT0-RE_OUT127. In detail, each of the original input exponents $IN0_{EXP}[7:0]$-$IN127_{EXP}[7:0]$ may be represented by bits IN[7], IN[6], IN[5], IN[4], IN[3], IN[2], IN[1], IN[0]. Each of the original weight exponents $W0_{EXP}[7:0]$-$W127_{EXP}[7:0]$ may be represented by bits W[7], W[6], W[5], W[4], W[3], W[2], W[1], W[0]. In FIG. 3, the serial delay computing circuit 220 includes a plurality of time delay circuits serially connected to each other, and the time delay circuits include two first time delay circuits 221, 222, two second time delay circuits 223, 224, two third time delay circuits 225, 226 and two fourth time delay circuits 227, 228.

The two first time delay circuits 221, 222 receive the bits IN[7], W[7], respectively. One (221) of the two first time delay circuits 221, 222 is configured to determine whether to delay eight unit time periods (+8t) according to a first bit (IN[7]) of the one of the original input exponents $IN0_{EXP}[7:0]$-$IN127_{EXP}[7:0]$, and another (222) of the two first time delay circuits 221, 222 is connected to the one (221) of the two first time delay circuits 221, 222 and configured to determine whether to delay the eight unit time periods (+8t) according to a first bit (W[7]) of the one of the original weight exponents $W0_{EXP}[7:0]$-$W127_{EXP}[7:0]$. For example, in response to determining that the first bit (IN[7]) is equal to one, the first time delay circuit 221 determines to bypass and not to delay. In response to determining that the first bit (IN[7]) is equal to zero, the first time delay circuit 221 determines to delay the exponent input signal RE_IN (e.g., one of the exponent input signals RE_IN0-RE_IN127) by the eight unit time periods (+8t).

The two second time delay circuits 223, 224 receive the bits IN[6], W[6], respectively. One (223) of the two second time delay circuits 223, 224 is connected to the another (222) of the two first time delay circuits 221, 222 and configured to determine whether to delay four unit time periods (+4t) according to a second bit (IN[6]) of the one of the original input exponents $IN0_{EXP}[7:0]$-$IN127_{EXP}[7:0]$, and another (224) of the two second time delay circuits 223, 224 is connected to the one (223) of the two second time delay circuits 223, 224 and configured to determine whether to delay the four unit time periods (+4t) according to a second bit (W[6]) of the one of the original weight exponents $W0_{EXP}[7:0]$-$W127_{EXP}[7:0]$.

The third time delay circuits 225, 226 receive the bits IN[5], W[5], respectively. One (225) of the two third time delay circuits 225, 226 is connected to the another (224) of the two second time delay circuits 223, 224 and configured to determine whether to delay two unit time periods (+2t) according to a third bit (IN[5]) of the one of the original input exponents $IN0_{EXP}[7:0]$-$IN127_{EXP}[7:0]$, and another (226) of the two third time delay circuits 225, 226 is connected to the one (225) of the two third time delay circuits 225, 226 and configured to determine whether to delay the two unit time periods (+2t) according to a third bit (W[5]) of the one of the original weight exponents $W0_{EXP}[7:0]$-$W127_{EXP}[7:0]$.

The fourth time delay circuits 227, 228 receive the bits IN[4], W[4], respectively. One (227) of the two fourth time delay circuits 227, 228 is connected to the another (226) of the two third time delay circuits 225, 226 and configured to determine whether to delay one unit time period (+1t) according to a fourth bit (IN[4]) of the one of the original input exponents $IN0_{EXP}[7:0]$-$IN127_{EXP}[7:0]$, and another (228) of the two fourth time delay circuits 227, 228 is connected to the one (227) of the two fourth time delay circuits 227, 228 and configured to determine whether to delay the one unit time period (+1t) according to a fourth bit (W[4]) of the one of the original weight exponents $W0_{EXP}[7:0]$-$W127_{EXP}[7:0]$.

Each of the delay time periods is equal to a sum of total unit time periods delayed by all of the time delay circuits of the serial delay computing circuit 220. Each of the delay time periods has a negative correlation with a sum of the one of the original input exponents $IN0_{EXP}[7:0]$-$IN127_{EXP}[7:0]$ and the one of the original weight exponents $W0_{EXP}[7:0]$-$W127_{EXP}[7:0]$. In FIG. 3, each of the delay time periods represents a delay time difference between the exponent delay output signal RE_OUT (e.g., one of the exponent delay output signals RE_OUT0-RE_OUT127) and the exponent input signal RE_IN (e.g., one of the exponent input signals RE_IN0-RE_IN127). The serial delay computing circuit 220 is configured to process most significant 4 bits (IN[7]-IN[4]) of the one of the original input exponents $IN0_{EXP}[7:0]$-$IN127_{EXP}[7:0]$ and most significant 4 bits (W[7]-W[4]) of the one of the original weight exponents $W0_{EXP}[7:0]$-$W127_{EXP}[7:0]$, i.e., the serial delay computing circuit 220 is configured to process one round, and the one round including adding the most significant 4 bits (IN[7]-IN[4]) and the most significant 4 bits (W[7]-W[4]). In another embodiment, the serial delay computing circuit 220 can be configured to process two rounds including a first round and a second round. The first round includes adding the most significant 4 bits (IN[7]-IN[4]) and the most significant 4 bits (W[7]-W[4]), i.e., $IN_{EXPM4b}+W_{EXPM4b}$. In the first round, the two first time delay circuits 221, 222, the two second time delay circuits 223, 224, the two third time delay circuits 225, 226 and the two fourth time delay circuits 227, 228 receive the bits IN[7], W[7], IN[6], W[6], IN[5], W[5], IN[4], W[4], respectively. The second round includes adding least significant 4 bits (IN[3]-IN[0]) of the one of the original input exponents $IN0_{EXP}$[7:0]-$IN127_{EXP}$[7:0] and least significant 4 bits (W[3]-W[0]) of the one of the original weight exponents $W0_{EXP}$[7:0]-$W127_{EXP}$[7:0], i.e., $IN_{EXPL4b}+WE_{XPL4b}$. In the second round, the two first time delay circuits 221, 222, the two second time delay circuits 223, 224, the two third time delay circuits 225, 226 and the two fourth time delay circuits 227, 228 receive the bits IN[3], W[3], IN[2], W[2], IN[1], W[1], IN[0], W[0], respectively.

The word line input driver unit 300 is connected to each of the exponent computing modules 200 via word lines, first input lines and second input lines. The word line input driver unit 300 generates a plurality of exponent input signals RE_IN0-RE_IN127, RE_TDC and the original input exponents $IN0_{EXP}$[7:0]-$IN127_{EXP}$[7:0]. The first input lines are configured to transmit the exponent input signals RE_IN0-RE_IN127, RE_TDC. The exponent input signals RE_IN0-RE_IN127, RE_TDC are rising edge input signals and are the same with each other. The second input lines are configured to transmit the original input exponents $IN0_{EXP}$[7:0]-$IN127_{EXP}$[7:0]. The word line input driver unit 300 is represented by "WL/INDRV & Edge Generator" and is located on a left side of the exponent computing modules 200.

The winner-take-all circuit 400 is connected to the time domain exponent computing array TD-ECA and configured to find out one of the exponent delay output signals RE_OUT0-RE_OUT127 as a maximum exponent adding signal RE_MAX. The one of the exponent delay output signals RE_OUT0-RE_OUT127 is corresponding to a minimum one of the delay time periods. In detail, in FIG. 4, the winner-take-all circuit 400 includes a plurality of first transistors N0-N127 (i.e., N0, N1, N2, . . . , N127), a second transistor P1 and an inverter INV. The first transistors N0-N127 are controlled by the exponent delay output signals RE_OUT0-RE_OUT127, respectively. The second transistor P1 is connected to the first transistors N0-N127 and controlled by the maximum exponent adding signal RE_MAX. The inverter INV has an input node and an output node. The input node is connected to the first transistors N0-N127 and the second transistor P1. The input node receives a maximum exponent adding signal bar RE_MAXB. The output node generates the maximum exponent adding signal RE_MAX according to the one of the exponent delay output signals RE_OUT0-RE_OUT127. Each of the first transistors N0-N127 is the NMOS transistor. The second transistor P1 is the PMOS transistor.

The dynamic logic block 500 is connected to the winner-take-all circuit 400 and configured to compare the maximum exponent adding signal RE_MAX with the exponent delay output signals RE_OUT0-RE_OUT127 to generate a plurality of flags FLAG0-FLAG127. In detail, the dynamic logic block 500 includes a plurality of dynamic logic circuits. The dynamic logic circuits are connected to the winner-take-all circuit 400 and the time domain exponent computing array TD-ECA. Each of the dynamic logic circuits is coupled to the maximum exponent adding signal RE_MAX and each of the exponent delay output signals RE_OUT0-RE_OUT127, and configured to generate the flags FLAG0-FLAG127 by comparing the maximum exponent adding signal RE_MAX and each of the exponent delay output signals RE_OUT0-RE_OUT127. Each of the dynamic logic circuits may be implemented by comparators or time to digital converters. Each of the flags FLAG0-FLAG127 is a multi-bit signal and has a negative correlation with a sum of the one of the original input exponents $IN0_{EXP}$[7:0]-$IN127_{EXP}$[7:0] and the one of the original weight exponents $W0_{EXP}$[7:0]-$W127_{EXP}$[7:0].

In one embodiment, the time domain exponent computing block TD-ECB further includes a time to digital converter (TDC) 600. The time to digital converter 600 is connected to the winner-take-all circuit 400. The time to digital converter 600 is configured to receive the maximum exponent adding signal RE_MAX from the winner-take-all circuit 400 and generate a maximum input exponent MAX_EXP[7:0] according to the maximum exponent adding signal RE_MAX. In detail, the time to digital converter 600 is connected between the word line input driver unit 300 and the winner-take-all circuit 400. The time to digital converter 600 is configured to receive the maximum exponent adding signal RE_MAX and the exponent input signal RE_TDC, and generate the maximum input exponent MAX_EXP[7:0] according to the exponent input signal RE_TDC and the maximum exponent adding signal RE_MAX. The maximum input exponent MAX_EXP[7:0] and the weighted input mantissas $WIN0_{MAN}$[7:0]-$WIN127_{MAN}$[7:0] are configured to perform the MAC operation of the mantissa part.

The input mantissa pre-align block IM-PAB is connected to the time domain exponent computing block TD-ECB. The input mantissa pre-align block IM-PAB is configured to receive a plurality of original input mantissas $INn_{MAN}$[7:0] (e.g., $IN0_{MAN}$[7:0]-$IN127_{MAN}$[7:0], one may be "$1M_6M_5M_4M_3M_2M_1M_0$") and shift the original input mantissas $INn_{MAN}$[7:0] according to the flags FLAG0-FLAG127 to generate a plurality of weighted input mantissas $WIN0_{MAN}$[7:0]-$WIN127_{MAN}$[7:0]. n may be equal to 0-127. Sparsity of the weighted input mantissas $WIN0_{MAN}$[7:0]-$WIN127_{MAN}$[7:0] is greater than sparsity of the original input mantissas $INn_{MAN}$[7:0]. In detail, the input mantissa pre-align block IM-PAB includes a plurality of shifters 700. The shifters 700 are connected to the dynamic logic block 500. Each of the shifters 700 is configured to receive one ($1M_6M_5M_4M_3M_2M_1M_0$) of the original input mantissas $INn_{MAN}$[7:0] and shift the one of the original input mantissas $INn_{MAN}$[7:0] according to one (FLAG) of the flags FLAG0-FLAG127 to generate one of the weighted input mantissas $WIN0_{MAN}$[7:0]-$WIN127_{MAN}$[7:0], and each of the shifters 700 includes at least one multiplexer (MUX), as shown in FIG. 5.

Reference is made to FIGS. 1, 2, 5 and 7. FIG. 7 shows a schematic view of a relationship between a plurality of weighted input mantissas $WIN0_{MAN}$[7:0]-$WIN127_{MAN}$[7:0] and a plurality of sums of original input exponents $IN0_{EXP}$[7:0]-$IN127_{EXP}$[7:0] and original weight exponents $W0_{EXP}$[7:0]-$W127_{EXP}$[7:0]. In FIG. 7, the original input mantissas $INn_{MAN}$[7:0] is corresponding to "$1M_6M_5M_4M_3M_2M_1M_0$". Each of the bits $M_6$, $M_5$, $M_4$, $M_3$, $M_2$, $M_1$, $M_0$ may be 1 or 0. The input mantissa pre-align block IM-PAB is configured to shift the original input mantissas $INn_{MAN}$[7:0] according to the flags FLAG0-FLAG127 to generate the weighted input mantissas $WIN0_{MAN}$[7:0]-$WIN127_{MAN}$[7:0]. The flags FLAG0-FLAG127 are corresponding to the sums of the original input exponents $IN0_{EXP}$[7:0]-$IN127_{EXP}$[7:0] and the original weight exponents $W0_{EXP}$[7:0]-$W127_{EXP}$[7:0].

In detail, when the sum ($IN_{En}+W_{En}$) of one of the original input exponents $IN0_{EXP}$[7:0]-$IN127_{EXP}$[7:0] and one of the original weight exponents $W0_{EXP}$[7:0]-$W127_{EXP}$[7:0] is equal to a maximum exponent adding value MAX(EXP), the weighted input mantissa ($WINn_{MAN}$[7:0]) is corresponding to "$1M_6M_5M_4M_3M_2M_1M_0$". When the sum ($IN_{En}$+$W_{En}$) of one of the original input exponents $IN0_{EXP}$[7:0]-$IN127_{EXP}$[7:0] and one of the original weight exponents $W0_{EXP}$[7:0]-$W127_{EXP}$[7:0] is equal to the maximum exponent adding value MAX(EXP) minus 1 (i.e., MAX(EXP)−1), the weighted input mantissa ($WINn_{MAN}$[7:0]) is corresponding to "$01M_6M_5M_4M_3M_2M_1$" that is the original input mantissa $INn_{MAN}$[7:0] right shifted by 1 bit. When the sum ($IN_{En}$+$W_{En}$) of one of the original input exponents $IN0_{EXP}$[7:0]-$IN127_{EXP}$[7:0] and one of the original weight exponents $W0_{EXP}$[7:0]-$W127_{EXP}$[7:0] is equal to the maximum exponent adding value MAX(EXP) minus 2 (i.e., MAX(EXP)−2), the weighted input mantissa ($WINn_{MAN}$[7:0]) is corresponding to "$001M_6M_5M_4M_3M_2$" that is the original input mantissa $INn_{MAN}$[7:0] right shifted by 2 bit. When the sum ($IN_{En}$+$W_{En}$) of one of the original input exponents $IN0_{EXP}$[7:0]-$IN127_{EXP}$[7:0] and one of the original weight exponents $W0_{EXP}$[7:0]-$W127_{EXP}$[7:0] is equal to the maximum exponent adding value MAX(EXP) minus 3 (i.e., MAX (EXP)−3), the weighted input mantissa ($WINn_{MAN}$[7:0]) is corresponding to "$0001M_6M_5M_4M_3$" that is the original input mantissa $INn_{MAN}$[7:0] right shifted by 3 bit. When the sum ($IN_{En}$+$W_{En}$) of one of the original input exponents $IN0_{EXP}$[7:0]-$IN127_{EXP}$[7:0] and one of the original weight exponents $W0_{EXP}$[7:0]-$W127_{EXP}$[7:0] is equal to the maximum exponent adding value MAX(EXP) minus 4 (i.e., MAX(EXP)−4), the weighted input mantissa ($WINn_{MAN}$[7:0]) is corresponding to "$00001M_6M_5M_4$" that is the original input mantissa $INn_{MAN}$[7:0] right shifted by 4 bit. When the sum ($IN_{En}$+$W_{En}$) of one of the original input exponents $IN0_{EXP}$[7:0]-$IN127_{EXP}$[7:0] and one of the original weight exponents $W0_{EXP}$[7:0]-$W127_{EXP}$[7:0] is equal to the maximum exponent adding value MAX(EXP) minus 5 (i.e., MAX(EXP)−5), the weighted input mantissa ($WINn_{MAN}$[7:0]) is corresponding to "$000001M_6M_5$" that is the original input mantissa $INn_{MAN}$[7:0] right shifted by 5 bit. When the sum ($IN_{En}$+$W_{En}$) of one of the original input exponents $IN0_{EXP}$[7:0]-$IN127_{EXP}$[7:0] and one of the original weight exponents $W0_{EXP}$[7:0]-$W127_{EXP}$[7:0] is equal to the maximum exponent adding value MAX(EXP) minus 6 (i.e., MAX(EXP)−6), the weighted input mantissa ($WINn_{MAN}$[7:0]) is corresponding to "$0000001M_6$" that is the original input mantissa $INn_{MAN}$[7:0] right shifted by 6 bit. When the sum ($IN_{En}$+$W_{En}$) of one of the original input exponents $IN0_{EXP}$[7:0]-$IN127_{EXP}$[7:0] and one of the original weight exponents $W0_{EXP}$[7:0]-$W127_{EXP}$[7:0] is equal to the maximum exponent adding value MAX(EXP) minus 7 (i.e., MAX(EXP)−7), the weighted input mantissa ($WINn_{MAN}$[7:0]) is corresponding to "00000001" that is the original input mantissa $INn_{MAN}$[7:0] right shifted by 7 bit. When the sum ($IN_{En}$+$W_{En}$) of one of the original input exponents $IN0_{EXP}$[7:0]-$IN127_{EXP}$[7:0] and one of the original weight exponents $W0_{EXP}$[7:0]-$W127_{EXP}$[7:0] is smaller than the maximum exponent adding value MAX(EXP) minus 7 (i.e., <MAX(EXP)−7), the weighted input mantissa ($WINn_{MAN}$[7:0]) is corresponding to "00000000" (i.e., all 0 input) that is the original input mantissa $INn_{MAN}$[7:0] right shifted by 8 bit.

Therefore, the floating point pre-alignment structure 100*a* for CIM applications of the present disclosure can utilize the time domain exponent computing block TD-ECB and the input mantissa pre-align block IM-PAB to shift the original input mantissas $INn_{MAN}$[7:0] according to the exponent part of the input and the exponent part of the weight and then perform the MAC operation of the mantissa part, thereby realizing the concept of input mantissa pre-alignment and improve the problem of conventional CIM operating floating point. In addition, the floating point pre-alignment structure 100*a* for CIM applications of the present disclosure does not lose accuracy and increases the sparsity of the weighted input mantissas $WIN0_{MAN}$[7:0]-$WIN127_{MAN}$[7:0] (i.e., increase input sparsity), thereby reducing power consumption and enhancing floating point CIM performance.

Figure 8:
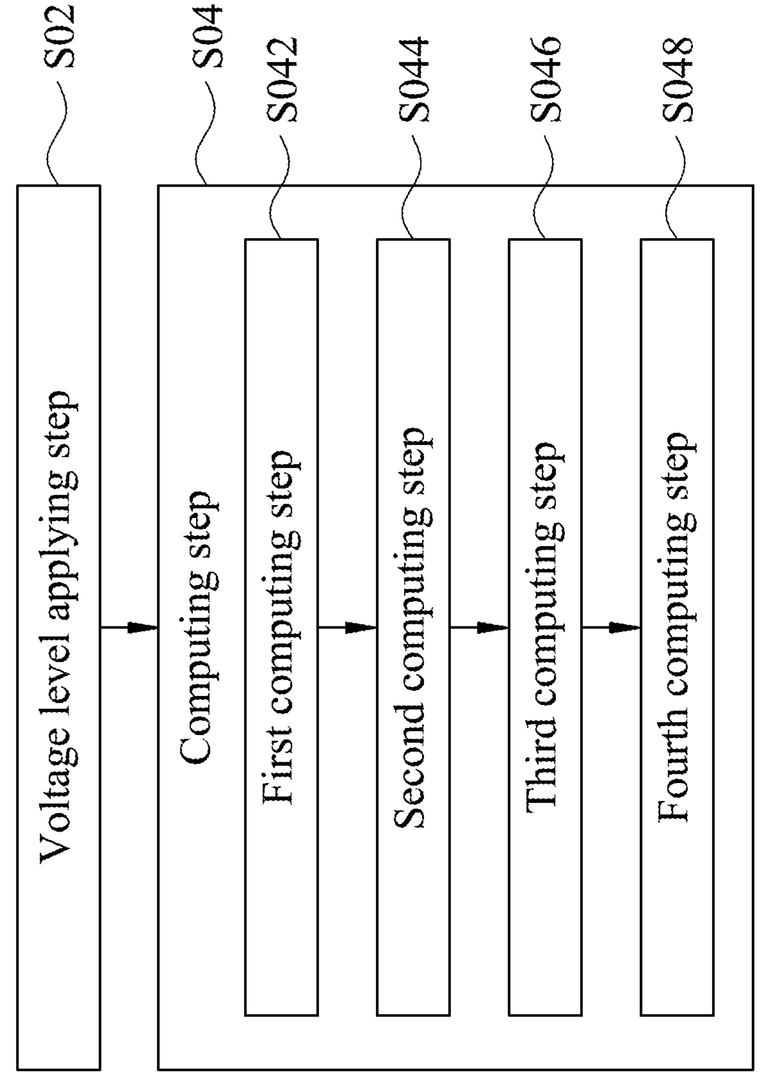
FIG. 8 shows a flow chart of a computing method of a floating point pre-alignment structure for computing-in-memory applications according to a third embodiment of the present disclosure.

Reference is made to FIGS. 1, 2 and 8. FIG. 8 shows a flow chart of a computing method S0 of a floating point pre-alignment structure for CIM applications according to a third embodiment of the present disclosure. The floating point pre-alignment structure for CIM applications may be the floating point pre-alignment structure 100 for CIM applications of FIG. 1 or the floating point pre-alignment structure 100*a* for CIM applications of FIG. 2. The computing method S0 includes performing a voltage level applying step S02 and a computing step S04. The voltage level applying step S02 includes applying a plurality of voltage levels to a plurality of exponent input signals RE_IN0-RE_IN127, a plurality of original input exponents $IN0_{EXP}$[7:0]-$IN127_{EXP}$[7:0], a plurality of original weight exponents $W0_{EXP}$[7:0]-$W127_{EXP}$[7:0] and a plurality of original input mantissas $INn_{MAN}$[7:0] (e.g., $IN0_{MAN}$[7:0]-$IN127_{MAN}$[7:0]). The computing step S04 is performed to configure a time domain exponent computing block TD-ECB to compute the original input exponents $IN0_{EXP}$[7:0]-$IN127_{EXP}$[7:0] and the original weight exponents $W0_{EXP}$[7:0]-$W127_{EXP}$[7:0]. In detail, the computing step S04 includes performing a first computing step S042, a second computing step S044, a third computing step S046 and a fourth computing step S048.

The first computing step S042 includes configuring a time domain exponent computing array TD-ECA to delay the exponent input signals RE_IN0-RE_IN127 by a plurality of delay time periods to generate a plurality of exponent delay output signals RE_OUT0-RE_OUT127, and each of the delay time periods is determined by adding one of the original input exponents $IN0_{EXP}$[7:0]-$IN127_{EXP}$[7:0] and one of the original weight exponents $W0_{EXP}$[7:0]-$W127_{EXP}$[7:0].

The second computing step S044 includes configuring a winner-take-all circuit 400 to find out one of the exponent delay output signals RE_OUT0-RE_OUT127 as a maximum exponent adding signal RE_MAX, and the one of the exponent delay output signals RE_OUT0-RE_OUT127 is corresponding to a minimum one of the delay time periods.

The third computing step S046 includes configuring a dynamic logic block 500 to compare the maximum exponent adding signal RE_MAX with the exponent delay output signals RE_OUT0-RE_OUT127 to generate a plurality of flags FLAG0-FLAG127.

The fourth computing step S048 includes configuring an input mantissa pre-align block IM-PAB to receive a plurality of original input mantissas $INn_{MAN}$[7:0] and shift the original input mantissas $INn_{MAN}$[7:0] according to the flags FLAG0-FLAG127 to generate a plurality of weighted input mantissas $WIN0_{MAN}$[7:0]-$WIN127_{MAN}$[7:0], and sparsity of the weighted input mantissas $WIN0_{MAN}$[7:0]-$WIN127_{MAN}$[7:0] is greater than sparsity of the original input mantissas $INn_{MAN}$[7:0].

Therefore, the computing method S0 of the present disclosure can shift the original input mantissas $INn_{MAN}$[7:0] according to the exponent part of the input and the exponent part of the weight and then perform the MAC operation of the mantissa part, thereby realizing the concept of input mantissa pre-alignment and improve the problem of conventional CIM operating floating point. Moreover, the computing method S0 of the present disclosure does not lose accuracy and increases the sparsity of the weighted input mantissas WIN0$_{MAN}$[7:0]-WIN127$_{MAN}$[7:0], thereby reducing power consumption and enhancing floating point CIM performance.

In one embodiment, the number of exponent computing modules 200, the number of the exponent input signals RE_IN0-RE_IN127, the number of the exponent delay output signals RE_OUT0-RE_OUT127, the number of the original input exponents IN0$_{EXP}$[7:0]-IN127$_{EXP}$[7:0], the number of the original weight exponents W0$_{EXP}$[7:0]-W127$_{EXP}$[7:0], the number of the flags FLAG0-FLAG127, the number of original input mantissas INn$_{MAN}$[7:0] and the number of the weighted input mantissas WIN0$_{MAN}$[7:0]-WIN127$_{MAN}$[7:0] are all 128, but the present disclosure is not limited thereto.

According to the aforementioned embodiments and examples, the advantages of the present disclosure are described below.

1. The floating point pre-alignment structure for CIM applications of the present disclosure and the computing method thereof of the present disclosure can utilize the time domain exponent computing block and the input mantissa pre-align block to shift the original input mantissas according to the exponent part of the input and the exponent part of the weight and then perform the MAC operation of the mantissa part, thereby realizing the concept of input mantissa pre-alignment and improve the problem of conventional CIM operating floating point.
2. The floating point pre-alignment structure for CIM applications of the present disclosure and the computing method thereof of the present disclosure do not lose accuracy and increase the sparsity of the weighted input mantissas, thereby reducing power consumption and enhancing floating point CIM performance.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A floating point pre-alignment structure for computing-in-memory applications, comprising:

a time domain exponent computing block configured to compute a plurality of original input exponents and a plurality of original weight exponents, wherein the time domain exponent computing block comprises:

a time domain exponent computing array configured to delay a plurality of exponent input signals by a plurality of delay time periods to generate a plurality of exponent delay output signals, wherein each of the delay time periods is determined by adding one of the original input exponents and one of the original weight exponents;

a winner-take-all circuit connected to the time domain exponent computing array and configured to find out one of the exponent delay output signals as a maximum exponent adding signal, wherein the one of the exponent delay output signals is corresponding to a minimum one of the delay time periods; and a dynamic logic block connected to the winner-take-all circuit and configured to compare the maximum exponent adding signal with the exponent delay output signals to generate a plurality of flags; and an input mantissa pre-align block connected to the time domain exponent computing block, wherein the input mantissa pre-align block is configured to receive a plurality of original input mantissas and shift the original input mantissas according to the flags to generate a plurality of weighted input mantissas, and sparsity of the weighted input mantissas is greater than sparsity of the original input mantissas.

2. The floating point pre-alignment structure for computing-in-memory applications of claim 1, wherein each of the delay time periods has a negative correlation with a sum of the one of the original input exponents and the one of the original weight exponents.

3. The floating point pre-alignment structure for computing-in-memory applications of claim 1, wherein the time domain exponent computing array comprises a plurality of exponent computing modules, and each of the exponent computing modules comprises:

a memory array comprising a plurality of memory cells, wherein the memory cells store the one of the original weight exponents; and a serial delay computing circuit connected to the memory array, wherein the serial delay computing circuit is configured to receive the one of the original input exponents and the one of the original weight exponents, and delay each of the exponent input signals by each of the delay time periods to generate each of the exponent delay output signals;

wherein each of the memory cells comprises a six-transistor static random access memory cell.

4. The floating point pre-alignment structure for computing-in-memory applications of claim 3, wherein the serial delay computing circuit comprises a plurality of time delay circuits serially connected to each other, and the time delay circuits comprise:

two first time delay circuits, wherein one of the two first time delay circuits is configured to determine whether to delay eight unit time periods according to a first bit of the one of the original input exponents, and another of the two first time delay circuits is connected to the one of the two first time delay circuits and configured to determine whether to delay the eight unit time periods according to a first bit of the one of the original weight exponents;

two second time delay circuits, wherein one of the two second time delay circuits is connected to the another of the two first time delay circuits and configured to determine whether to delay four unit time periods according to a second bit of the one of the original input exponents, and another of the two second time delay circuits is connected to the one of the two second time delay circuits and configured to determine whether to delay the four unit time periods according to a second bit of the one of the original weight exponents;

two third time delay circuits, wherein one of the two third time delay circuits is connected to the another of the two second time delay circuits and configured to determine whether to delay two unit time periods according to a third bit of the one of the original input exponents, and another of the two third time delay circuits is connected to the one of the two third time delay circuits and configured to determine whether to delay the two unit time periods according to a third bit of the one of the original weight exponents; and two fourth time delay circuits, wherein one of the two fourth time delay circuits is connected to the another of the two third time delay circuits and configured to determine whether to delay one unit time period according to a fourth bit of the one of the original input exponents, and another of the two fourth time delay circuits is connected to the one of the two fourth time delay circuits and configured to determine whether to delay the one unit time period according to a fourth bit of the one of the original weight exponents;

wherein each of the delay time periods is equal to a sum of total unit time periods delayed by all of the time delay circuits of the serial delay computing circuit.

5. The floating point pre-alignment structure for computing-in-memory applications of claim 1, wherein the winner-take-all circuit comprises:

a plurality of first transistors controlled by the exponent delay output signals, respectively;

a second transistor connected to the first transistors and controlled by the maximum exponent adding signal; and an inverter having an input node and an output node, wherein the input node is connected to the first transistors and the second transistor, and the output node generates the maximum exponent adding signal according to the one of the exponent delay output signals.

6. The floating point pre-alignment structure for computing-in-memory applications of claim 1, wherein the dynamic logic block comprises:

a plurality of dynamic logic circuits connected to the winner-take-all circuit and the time domain exponent computing array, wherein each of the dynamic logic circuits is coupled to the maximum exponent adding signal and each of the exponent delay output signals and configured to generate the flags by comparing the maximum exponent adding signal and each of the exponent delay output signals;

wherein each of the flags is a multi-bit signal and has a negative correlation with a sum of the one of the original input exponents and the one of the original weight exponents.

7. The floating point pre-alignment structure for computing-in-memory applications of claim 1, wherein the input mantissa pre-align block comprises:

a plurality of shifters connected to the dynamic logic block, wherein each of the shifters is configured to receive one of the original input mantissas and shift the one of the original input mantissas according to one of the flags to generate one of the weighted input mantissas, and each of the shifters comprises at least one multiplexer.

8. The floating point pre-alignment structure for computing-in-memory applications of claim 1, wherein the time domain exponent computing block further comprises:

a time to digital converter connected to the winner-take-all circuit, wherein the time to digital converter is configured to receive the maximum exponent adding signal from the winner-take-all circuit and generate a maximum input exponent according to the maximum exponent adding signal.

9. A computing method of a floating point pre-alignment structure for computing-in-memory applications, comprising:

performing a voltage level applying step, wherein the voltage level applying step comprises applying a plurality of voltage levels to a plurality of exponent input signals, a plurality of original input exponents, a plurality of original weight exponents and a plurality of original input mantissas; and performing a computing step to configure a time domain exponent computing block to compute the original input exponents and the original weight exponents, wherein the computing step comprises:

performing a first computing step, wherein the first computing step comprises configuring a time domain exponent computing array to delay the exponent input signals by a plurality of delay time periods to generate a plurality of exponent delay output signals, and each of the delay time periods is determined by adding one of the original input exponents and one of the original weight exponents;

performing a second computing step, wherein the second computing step comprises configuring a winner-take-all circuit to find out one of the exponent delay output signals as a maximum exponent adding signal, and the one of the exponent delay output signals is corresponding to a minimum one of the delay time periods;

performing a third computing step, wherein the third computing step comprises configuring a dynamic logic block to compare the maximum exponent adding signal with the exponent delay output signals to generate a plurality of flags; and performing a fourth computing step, wherein the fourth computing step comprises configuring an input mantissa pre-align block to receive the original input mantissas and shift the original input mantissas according to the flags to generate a plurality of weighted input mantissas, and sparsity of the weighted input mantissas is greater than sparsity of the original input mantissas.

10. The computing method of the floating point pre-alignment structure for computing-in-memory applications of claim 9, wherein the floating point pre-alignment structure for computing-in-memory applications comprises:

the time domain exponent computing block configured to compute the original input exponents and the original weight exponents, wherein the time domain exponent computing block comprises:

the time domain exponent computing array configured to delay the exponent input signals by the delay time periods to generate the exponent delay output signals;

the winner-take-all circuit connected to the time domain exponent computing array and configured to find out the one of the exponent delay output signals as the maximum exponent adding signal; and the dynamic logic block connected to the winner-take-all circuit and configured to compare the maximum exponent adding signal with the exponent delay output signals to generate the flags; and the input mantissa pre-align block connected to the time domain exponent computing block, wherein the input mantissa pre-align block is configured to receive the original input mantissas and shift the original input mantissas according to the flags to generate the weighted input mantissas.

11. The computing method of the floating point pre-alignment structure for computing-in-memory applications of claim 10, wherein the time domain exponent computing block further comprises:
a time to digital converter connected to the winner-take-all circuit, wherein the time to digital converter is configured to receive the maximum exponent adding signal from the winner-take-all circuit and generate a maximum input exponent according to the maximum exponent adding signal.

12. The computing method of the floating point pre-alignment structure for computing-in-memory applications of claim 9, wherein each of the delay time periods has a negative correlation with a sum of the one of the original input exponents and the one of the original weight exponents.

13. The computing method of the floating point pre-alignment structure for computing-in-memory applications of claim 9, wherein the time domain exponent computing array comprises a plurality of exponent computing modules, and each of the exponent computing modules comprises:
a memory array comprising a plurality of memory cells, wherein the memory cells store the one of the original weight exponents; and
a serial delay computing circuit connected to the memory array, wherein the serial delay computing circuit is configured to receive the one of the original input exponents and the one of the original weight exponents, and delay each of the exponent input signals by each of the delay time periods to generate each of the exponent delay output signals;
wherein each of the memory cells comprises a six-transistor static random access memory cell.

14. The computing method of the floating point pre-alignment structure for computing-in-memory applications of claim 13, wherein the serial delay computing circuit comprises a plurality of time delay circuits serially connected to each other, and the time delay circuits comprise:
two first time delay circuits, wherein one of the two first time delay circuits is configured to determine whether to delay eight unit time periods according to a first bit of the one of the original input exponents, and another of the two first time delay circuits is connected to the one of the two first time delay circuits and configured to determine whether to delay the eight unit time periods according to a first bit of the one of the original weight exponents;
two second time delay circuits, wherein one of the two second time delay circuits is connected to the another of the two first time delay circuits and configured to determine whether to delay four unit time periods according to a second bit of the one of the original input exponents, and another of the two second time delay circuits is connected to the one of the two second time delay circuits and configured to determine whether to delay the four unit time periods according to a second bit of the one of the original weight exponents;
two third time delay circuits, wherein one of the two third time delay circuits is connected to the another of the two second time delay circuits and configured to determine whether to delay two unit time periods according to a third bit of the one of the original input exponents, and another of the two third time delay circuits is connected to the one of the two third time delay circuits and configured to determine whether to delay the two unit time periods according to a third bit of the one of the original weight exponents; and
two fourth time delay circuits, wherein one of the two fourth time delay circuits is connected to the another of the two third time delay circuits and configured to determine whether to delay one unit time period according to a fourth bit of the one of the original input exponents, and another of the two fourth time delay circuits is connected to the one of the two fourth time delay circuits and configured to determine whether to delay the one unit time period according to a fourth bit of the one of the original weight exponents;
wherein each of the delay time periods is equal to a sum of total unit time periods delayed by all of the time delay circuits of the serial delay computing circuit.

15. The computing method of the floating point pre-alignment structure for computing-in-memory applications of claim 9, wherein the winner-take-all circuit comprises:
a plurality of first transistors controlled by the exponent delay output signals, respectively;
a second transistor connected to the first transistors and controlled by the maximum exponent adding signal; and
an inverter having an input node and an output node, wherein the input node is connected to the first transistors and the second transistor, and the output node generates the maximum exponent adding signal according to the one of the exponent delay output signals.

16. The computing method of the floating point pre-alignment structure for computing-in-memory applications of claim 9, wherein the dynamic logic block comprises:
a plurality of dynamic logic circuits connected to the winner-take-all circuit and the time domain exponent computing array, wherein each of the dynamic logic circuits is coupled to the maximum exponent adding signal and each of the exponent delay output signals and configured to generate the flags by comparing the maximum exponent adding signal and each of the exponent delay output signals;
wherein each of the flags is a multi-bit signal and has a negative correlation with a sum of the one of the original input exponents and the one of the original weight exponents.

17. The computing method of the floating point pre-alignment structure for computing-in-memory applications of claim 9, wherein the input mantissa pre-align block comprises:
a plurality of shifters connected to the dynamic logic block, wherein each of the shifters is configured to receive one of the original input mantissas and shift the one of the original input mantissas according to one of the flags to generate one of the weighted input mantissas, and each of the shifters comprises at least one multiplexer.

18. A floating point pre-alignment structure for computing-in-memory applications, comprising:
a time domain exponent computing block configured to compute a plurality of original input exponents and a plurality of original weight exponents to generate a plurality of flags, wherein each of the flags is determined by adding one of the original input exponents and one of the original weight exponents; and
an input mantissa pre-align block connected to the time domain exponent computing block, wherein the input mantissa pre-align block is configured to receive a plurality of original input mantissas and shift the original input mantissas according to the flags to generate a plurality of weighted input mantissas, and sparsity of the weighted input mantissas is greater than sparsity of the original input mantissas;

wherein each of the flags has a negative correlation with a sum of the one of the original input exponents and the one of the original weight exponents.

19. The floating point pre-alignment structure for computing-in-memory applications of claim 18, wherein the time domain exponent computing block comprises:

a time domain exponent computing array configured to delay a plurality of exponent input signals by a plurality of delay time periods to generate a plurality of exponent delay output signals, wherein each of the delay time periods is determined by adding the one of the original input exponents and the one of the original weight exponents, and each of the flags is determined according to the exponent delay output signals.

20. The floating point pre-alignment structure for computing-in-memory applications of claim 19, wherein the time domain exponent computing array comprises a plurality of exponent computing modules, and each of the exponent computing modules comprises:

a memory array comprising a plurality of memory cells, wherein the memory cells store the one of the original weight exponents; and a serial delay computing circuit connected to the memory array, wherein the serial delay computing circuit is configured to receive the one of the original input exponents and the one of the original weight exponents and delay each of the exponent input signals by each of the delay time periods to generate each of the exponent delay output signals;

wherein each of the memory cells comprises a six-transistor static random access memory cell.

* * * * *